United States Patent [19]

Murphy et al.

[11] 4,139,463
[45] Feb. 13, 1979

[54] METHOD OF AND MEANS FOR OILY WATER SEPARATION

[76] Inventors: Roger H. Murphy, Modesto, Calif.; Racor Industries, Inc., 02, Modesto, Calif.

[21] Appl. No.: 777,131

[22] Filed: Mar. 14, 1977

[51] Int. Cl.² ............... B01D 23/00; B01D 37/00
[52] U.S. Cl. ................... 210/73 W; 210/84; 210/254; 210/258; 210/259; 210/305; 210/456; 210/519
[58] Field of Search ............ 210/23 R, 73 R, 73 W, 210/84, 254, 258, 259, 305, 310, 320, 456, 519, DIG. 5; 55/463

[56] References Cited

U.S. PATENT DOCUMENTS

| | | | |
|---|---|---|---|
| 3,339,736 | 9/1967 | Muller | 210/258 X |
| 3,565,252 | 2/1971 | Sheehy | 210/254 X |
| 3,836,000 | 9/1974 | Jakubek | 210/258 X |
| 3,878,094 | 4/1975 | Conley et al. | 210/DIG. 5 X |
| 3,937,662 | 2/1976 | Bartik | 210/73 W X |
| 3,996,136 | 12/1976 | Jakubek et al. | 210/73 W |
| 3,996,603 | 6/1976 | Grant | 210/23 R X |

Primary Examiner—Morris O. Wolk
Assistant Examiner—Michael S. Marcus
Attorney, Agent, or Firm—Phillips, Moore, Weissenberger, Lempio & Majestic

[57] ABSTRACT

An oily water separator method and means using a suction pump to withdraw oil and water from a ship's bilge or sump. To decrease emulsification of the mixture, the pump is positioned downstream of an initial filter and the separator. The pump draws the oil-water mixture by suction through a particulate filter and then into a separator. Fluid flow is slowed by the specially configured baffled separator to allow the majority of the inter-mixed oil to separate from the water by gravity before reaching the pump. The suction pump draws the water from the lower portion of the separator housing and pumps the now almost oil-free water through two additional filter stages. Means are included for reversing the pump direction to force accumulated oil floating on water from the separator housing to a holding tank.

21 Claims, 7 Drawing Figures

FIG_2

FIG_3

FIG_4

METHOD OF AND MEANS FOR OILY WATER SEPARATION

BACKGROUND OF THE INVENTION

This invention relates to a method of and means for separating oil from water in order to allow substantially oil-free discharge of water into streams or bays. In particular, the invention relates to a separator-filter combination which is adaptable for use in small boats, harbor craft, ships, or shore installations.

Concern over the purity of water in harbors and streams has recently resulted in extremely rigid standards for discharge of waste fluids into such streams. These standards are applicable both to waterborne installations and to shore establishments. In the waterborne environment, particularly with small harbor craft, a continuing problem of maintaining a dry bilge imposes a hardship on the operator if he must place his money producing craft alongside a particularly designed pier every time it is necessary to pump bilges. It is an inherent characteristic of such waterborne craft that not only does water accumulate in the bilges, but fuel and lubricating oil is almost always present in the bilges. In addition to the residue from operating internal combustion engines which usually power small watercraft, an oil spill in the bilges is not uncommon. In ships where steam may be the primary means for providing propulsion, oil is also present in the bilges. Such oil from steam plants, of course, comes from the same source, i.e., lubrication or the fuel utilized in the boiler to generate the steam.

Pumping of bilges is an absolute necessity in any waterborne craft or ship. To leave free liquid in the bilges has a detrimental effect on the stability of the ship. It is well known that the larger the free surface of water in a ship's compartment, the greater the instability that free surface imparts to the ship. It is also well known that free liquid in the bilges adversely affects the metacentric height or righting moment of the ship. In addition to the stability problem which is of vital importance at any time in a ship or watercraft, the accumulation of liquid, particularly water, in a steel hulled or a wooden hulled ship can cause corrosion or dry rot if allowed to remain. Finally, the oil, which as noted above is almost endemic in bilges, is an ever present fire hazard.

Having presented the problem of the boat owner, it is appropriate to present the problem of the environmentalist. For years, boat owners and ship owners have solved the problem of removing bilge water from the hull by pumping the residue over the side and letting nature take its course in breaking down the oil and other contaminants that was present in the effluent. It is unnecessary to elaborate on recent changes in the attitude of the public and consequently, the government, toward the environmental standards for streams and bodies of water. The standards specify the effluent pumped from a ship leave the water surrounding the ship "sheen free" and further cause no discoloration below the surface of the water. It is immediately apparent to those skilled in the art that pumping any bilge water over the side immediately runs the risk of violating these rather stringent standards. In summary, what must be accomplished is that all solids must be removed from the bilge water before discharge, all agents which discolor the water must be removed from the water, and finally, all oil or hydrocarbon content must be removed from the water.

Limiting factors in designing a system to accomplish the above objects of providing a means to effectively remove hydrocarbons and other contaminants from the oily bilge water in a small waterborne craft include size and weight. In commercial craft, such as fishing vessels, size and weight becomes particularly important as additional weight added to the craft or space used by machinery is weight and space that is effectively lost to dollar producing cargo. Another limiting factor is the capacity of the pump. Such a pump must have sufficient capacity to empty the bilges in a reasonable period of time. Furthermore, a bilge pump may in certain circumstances be utilized to dewater the hull of a vessel that has been holed in an accident. Ideally, one would like a high capacity pump which is lightweight and takes up a small amount of space. Unfortunately, high capacity pumps have a tendency to emulsify oil and water to the point where separation of the oil and water becomes difficult. Furthermore, a filter system which is capable of handling the output of a high capacity pump must of necessity be very large. Therefore, it becomes necessary to compromise between the size and weight constraints dictated by small water craft and the capacity of the system.

One other problem associated with an oily water separator of the type envisioned is the ability to discharge large amounts of oil-free water while retaining the separated oil and contaminants on board. Thus, it is necessary to provide for extraction of the separated oil from the separator and for communication of that oil to a holding tank in order not to exceed the storage capacity of the separator.

Accordingly, this invention provides an oily water separator, which may include a prefilter to remove particulate matter greater than a predetermined size, comprising a separator which removes bulk oil from the oily water stream. After bulk oil is removed from the stream, the almost oil-free water is pumped through coalescing elements and finally through a finish or polish filter to remove essentially all remaining hydrocarbon residue leaving sheen free and uncolored effluent for discharge. The system may also include automatic sensing elements to reverse the flow of the pump which, in combination with check valves in the system, allow for communication of accumulated oil in the separator to a holding tank. Normal pump flow may be automatically restored when the accumulated oil has been removed from the separator. The oily water separator may be limited in size to make it adaptable for use in small craft.

SUMMARY OF THE INVENTION

Broadly stated, the method of this invention for the separation of immiscible fluids of differing densities comprises the steps of providing a first elongated enclosed volume having its axis of elongation vertically oriented and coupling a source of immiscible fluids with the first elongated enclosed volume intermediate the upper and lower ends thereof. It further entails deflecting the flow of fluids communicated to the first elongated enclosed volume in the interior of the enclosed volume so that relatively heavier fluid communicated to the volume from the source separates from the relatively lighter fluids concurrently communicated to the volume to form a layered mixture. It also includes the step of providing a second elongated enclosed volume also having its axis of elongation vertically oriented. It includes the steps of withdrawing fluid from the lower portion of the first elongated enclosed volume so that additional immiscible fluids are communicated to the volume by suction and then communicating the withdrawn fluid under pressure to the second elongated enclosed volume where the flow of fluid is deflected to allow additional separation of heavier and lighter fluids. It includes the steps of venting heavier fluid relatively free of lighter fluid from the lower portion of the second elongated enclosed volume and extracting, simultaneously with the venting, fluid from the upper portion of the second elongated enclosed volume. It includes the final steps of communicating the extracted fluid from the upper portion of the second elongated enclosed volume to the first elongated enclosed volume intermediate the upper and lower ends thereof and periodically extracting separated lighter fluid from the upper portion of the first elongated volume.

The invention includes an apparatus comprised of the various means for accomplishing the above steps. The invention also includes a baffled separator for use in an oily water separator apparatus which is comprised of first and second hollow cone members generally of equal size and rigidly affixed one to the other at their bases to form a first cavity with the first cone member truncated to form a hole communicating with the first cavity. Also included are third and fourth hollow cone members generally of equal size and larger than the first and second hollow cone members. First and second hollow cylinders are affixed to the second cone member piercing the surface of revolution thereof and extending outwardly therefrom. The fourth cone member is affixed to the first and second hollow cylinders and the third cone member is affixed in a base to base relation with the fourth cone member to form a second cavity containing the first and second hollow cone members. The first and second hollow cylinders pierce the surface of revolution of the fourth cone member to communicate with the first cavity through the second cavity while the third cone member is truncated to form a hole communicating with the second cavity. Conduit means may be affixed to the hole in the third cone member to communicate oil and water to the third cone member.

The aforementioned objects and other objects become apparent from a study of the accompanying specification and the following drawings.

DETAILED DESCRIPTION OF THE PREFERRED EMBODIMENT

Figures 1, 7:
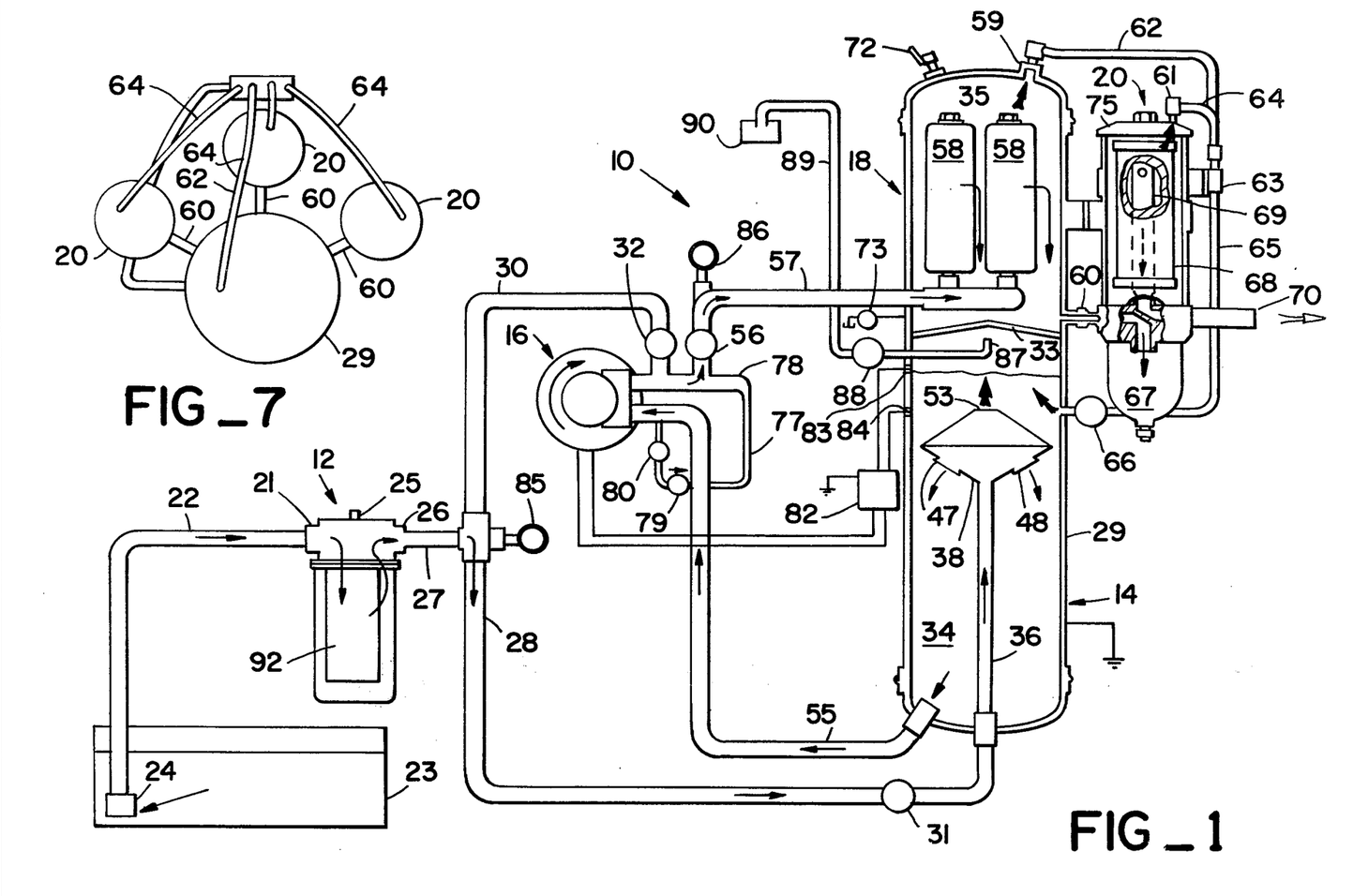
FIG. 1 is a drawing partially in section and partially schematic of a preferred embodiment of this invention, showing the fluid flow during the separation phase.
FIG. 7 is a top view of the separator in the preferred embodiment showing the final filter stage relative the separator.

Referring to FIG. 1, an oily water separator system 10 in accord with this invention is shown partially schematically. The oily water separator system 10 is comprised of a first stage filter 12, a separator stage 14, a pump 16, a coalescing filter stage 18, and a final or polishing filter stage 20. Each of these sections will be discussed in the ensuing description of the overall separator system.

An intake port 21 of the first stage filter 12 is adapted for connection with an intake conduit 22 leading to a bilge or sump wherein a water-oil mixture may have collected. It is appropriate to provide a foot valve 24 or a check valve (not shown) on intake conduit 22 to maintain a prime in the system and to prevent backflow from the oily-water separator system.

First stage filter 12 is conventional in design and is primarily for the purpose of removing gross particulate matter greater than a predetermined size in the oily water withdrawn from bilge 23. This filter may include a vent 25. The first stage filter 12 is also provided with outlet port 26 communicating with a branched conduit 27. The first leg of branched conduit 27, conduit 28, communicates with a baffled separator 38 mounted in the lower or separator chamber 34 of a two compartment separator and filter housing 29. The second leg of branched conduit 27, conduit 30, communicates with pump 16. Conduit 28 is provided with a one-way check valve 31 allowing communication from first stage filter 12 to baffled separator 38 and blocking communication from baffled separator 38 to the first stage filter 12. Conduit 30 is provided with a similar check valve 32 which permits communication between first stage filter 12 and pump 16 and prevents communication in the reverse direction from pump 16 to first stage filter 12.

Separator and filter housing 29 is divided into two compartments each an elongated enclosed vertically oriented volume and separated from the other compartment by bulkhead 33. The lower compartment forms separator chamber 34 and the upper forms coalescer filter chamber 35. There is no communication between lower chamber 34 and upper chamber 35 interior of the separator and filter housing 29. Conduit 28 which communicates with baffled separator 38 is connected thereto by an upstanding pipe 36 piercing the housing 29 and which has affixed at the upper end thereof the baffled separator 38.

Figures 5, 6:
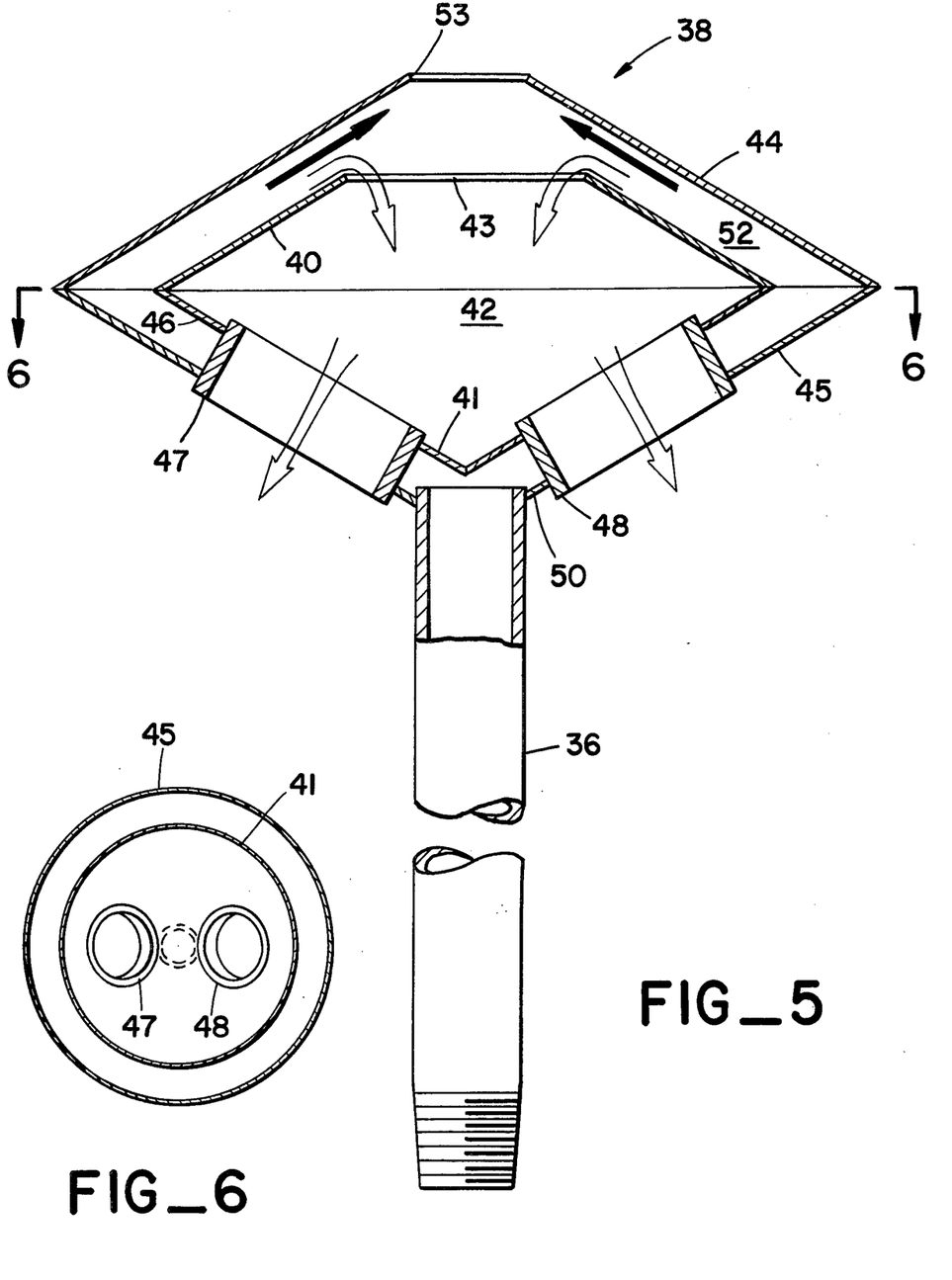
FIG. 5 is a view partly in section of the separator utilized in both the aforedescribed embodiments.
FIG. 6 is a reduced sectional view of the separator shown in FIG. 5 taken in line 6—6 of FIG. 5.

Referring to FIG. 5 for a detailed description of the baffled separator 38, it can be seen that upstanding pipe 36 is affixed by welding or the like to the baffled separator 38. Baffled separator 38 is formed of first and second hollow cone members 40 and 41 fixed one to the other at their bases to form a first cavity 42. The first hollow cone member 40 is truncated to form a hole 43 communicating with the first cavity. The baffled separator 38 further is comprised of a third hollow cone member 44 and a fourth hollow cone member 45 generally of equal but larger size than the first and second hollow cone members. Affixed to and piercing the surface of revolution 46 of the second hollow cone member 41 are first hollow cylinder 47 and a second hollow cylinder 48. The first and second hollow cylinders extend outwardly of the surface revolution 46 and are affixed through the fourth cone member 45 in a coaxial relationship with the second cone member 41. The fourth cone member 45 is truncated to form a hole 50 in which the pipe 36 is affixed as previously noted. The fourth cone member thus forms, with the second cone member, a second cavity 52 which, with the third cone member 44 affixed in a base to base relationship to the fourth hollow cone member, extends around the outside of the first and second cone members. The third hollow cone member is also truncated to form a hole 53 communicating the second cavity 52 outwardly of the separator. It will become more apparent in the discussion of the operation of the apparatus why this structure is used. However, suffice it to say at this time that oily water or a flow of immiscible and differing density fluids may be communicated to the separator through pipe 36 and this structure deflects and slows the flow of mixed oil and water or differing density fluids sufficiently so that oil or the lighter fluid is allowed to rise and pass through the topmost hole 53 while water or the heavier fluid settles into the first cavity 42 and passes outwardly through the hollow cylinders 47 and 48 into the lower part of separator chamber 34.

Turning back to FIG. 1, fluid in the lower portion of separator chamber 34 which is generally oil-free water or relatively high density fluid, is withdrawn through a conduit 55 by pump 16 which is bidirectional, and preferably of a low emulsifying type. It is important to understand that pump 16 is located downstream of the separator stage of this invention to lessen the emulsification of the oil-water mixture being withdrawn from bilge 23. In the past, some oily water separators have suffered from the drawback of emulsification of the bilge water prior to reaching the separator phase. The present invention which includes the unique baffled separator, provides a more efficient separator system. The generally oil-free water which is drawn by pump 16 from separator chamber 34 is pumped under pressure through a check valve 56 and by conduit 50 into coalescing filters 58 which are mounted in coalescer chamber 35. Practically all of the remaining small particles of oil are coalesced by coalescing filter 58 in a manner well known in the art so that the larger oil globules will deflect and travel upwardly to the top of the coalescer chamber 35 to be withdrawn along with some intermixed water through a filter manifold 59.

A plurality of outlets 60 (see FIG. 7) from coalescer chamber 35 communicate relatively oil-free and contaminate free water to a plurality of final or polishing filters 20 which are of the activated charcoal type. These final or polishing filters are well known in the art and will be only briefly described herein. Each charcoal filter element 68 divides the enclosing chamber into a first and a second part with the immiscible oil and water communicated to the first part so that the water passes through the element to the second part. In the preferred embodiment, it has been found that a plurality of these final or polishing filters may be used in a parallel arrangement as shown in FIG. 7, each having its own separate manifold 60. Each final or polishing filter 20 is fitted with outlet manifold 61 at the top thereof to allow accumulated oil and some intermixed water to be drawn off the first part of each of the final or polishing filters.

A conduit 62 communicates outlet manifold 59 from the coalescing chamber to an oil collecting manifold 63. Similarly, conduits 64 communicate each outlet manifold 61 of the final or polishing filter to the same oil collecting manifold 63. A single conduit 65 communicates the oil collecting manifold 63 to the upper portion of separator chamber 34. A check valve 66 is positioned in conduit 65 to permit fluid flow only from the oil collecting manifold 63 to the separator chamber 34.

The final or polishing filter 20 is formed as noted above with a charcoal element so that fluid entering the filter through conduit 60 is deflected to a lower chamber 67 which may be of transparent or translucent material such as glass to allow visual inspection of the effluent. Fluid in lower chamber 67, which is a part of the aforedescribed first part, flows upwardly adjacent the outside of the charcoal filter element 68 with water passing through the filter element to the second part and thence outwardly in a central tube 69 in a manner well known in the art. Central tube 69 communicates with a system outlet 70 which may be in the form of an interconnecting conduit as shown in FIG. 7 when three final or polishing filters are utilized.

A vent 72 may be provided in coalescer chamber 35 along with a drain valve 73. The purpose of the vent 72 and drain 73 is to facilitate cleaning and changing the enclosed filters.

The final or polishing filters 20 are each formed with cover elements 75 which may be removed to change the filter element. No further discussion will be made of these filters as they are well known in the art.

In this embodiment, a fluid bypass 77 is incorporated in the system between conduit 55 and a conduit 78 which communicates pump 16 with check valve 56. Bypass 77 is formed with a check valve 79 and a shutoff valve 80. Check valve 79 permits fluid flow from conduit 55 to conduit 78 and blocks communication of fluid from conduit 78 to conduit 55.

The system includes a power and sensing circuit 82. Power and sensing circuit 82 provides power to pump 16 while in a logic section of the sensing portion of the power and sensing circuit the direction of rotation of pump 16 is determined. A time delay may be provided in the logic of the power and sensing circuit to allow the pump to come to a rest before power is supplied to rotate the pump in the reverse direction. In particular, power and sensing circuit 82 has an upper probe 83 and a lower probe 84 which insulatingly penetrate the shell of housing 29 in the upper portion of the separator chamber 34. The upper and lower probes are to determine the level of separated oil accumulated in the upper portion of separator chamber 34. Upon determination of a certain level of oil in the upper portion of separator chamber 34, the direction of pump 16 is reversed and oil is discharged from the separator chamber into a separate oil or sump tank 90. Probe 83 may be a single conductor probe sealed through an insulated hole so that when probe 83 is in contact with water, a current is conducted between probe 83 and the side of separator chamber 34 which forms a ground. Probe 84 may operate in a similar manner so that when water is in the vicinity of probe 84, the current is conducted between probe 84 and the casing of the separator chamber 34. Other sensing elements may be substituted, including a sight gauge wherein a manual reversing switch would be provided. The particular logic will become more apparent in the discussion of the operation of this device.

It has been found helpful to provide certain pressure determining gauges at particular points in the conduits interconnecting the various elements in this system in order to determine when it is necessary to change filters. In particular, a vacuum gauge 85 may be positioned in branch conduit 27 at the junction of conduits 28 and 30. This vacuum gauge allows the operator to monitor the suction in the system to determine if the first stage filter 12 has become clogged with particulate matter.

A pressure gauge 86 may be located in conduit 57 to monitor the pressure of fluid passing from the pump to the coalescing elements 58. An increase of pressure at gauge 86 indicates the coalescing filters have become clogged with either oil or particulate matter or both.

Finally a relatively small diameter oil drain line 87 is provided at the upper portion of separator chamber 34 for the purpose of removing oil which accumulates at the top of chamber 34. The process of removing the oil will become more apparent in the discussion of the operation. Oil drain line 87 is provided with a check valve 88 exterior of separator and filter housing 29 allowing communication of oil outwardly of the upper portion of separator chamber 34 but preventing fluid from passing into chamber 34. Downstream of check valve 88 is a conduit 89 which leads to a sump 90 for storage of separated oil.

OPERATION OF THE PREFERRED EMBODIMENT

Operation of the preferred embodiment should be evident to those skilled in the art. However, a discussion is considered important to have a complete understanding of the system. It is to be understood that this system is designed primarily for use in marine craft to separate oil and water. However, the principles embodied herein and the structures described herein are equally applicable to any installation wherein a relatively high density fluid such as water having contaminants therein including immiscible relatively low density fluid such as hydrocarbon or oil must be pumped from a sump and the high density fluid discharged into a stream which is subject to strict environmental standards requiring only sheen free and uncolored water to be discharged. In its broadest sense, the device is applicable to any environment wherein a relatively high density fluid must be separated from lower density fluids, the heavier fluid immiscible in the low density fluid.

Still referring to FIG. 1, the check valves and pump rotation are shown in the normal bilge pumping cycle wherein clean effluent is discharged through conduit 70 which may lead outwardly of the water craft hull (not shown). Pump rotation in FIG. 1 for normal operation is such that fluid is drawn from the bilge or sump 23 through the first stage filter 12. It is to be understood that the pump may be started manually upon knowledge of an excessive amount of water in the bilges of the associated water craft or an automatic circuit could be included in the system to turn the pump on upon the fluid level reaching a predetermined depth. Contaminated water passing through first stage filter 12 will have gross particulate matter removed by a conventional filter element 92 wherein, for example, the contaminated water passes to the inner portion of the filter element 92 and then passes outwardly through the cylindrical sides of a mesh element and into conduit 27. This stage may remove particulate matter larger than 25 microns. During normal operation fluid passes through conduit 27 and takes branch conduit 28 to pass into the separator and filter housing by way of pipe 36 and separator 38. It should be noted that the direction of rotation of pump 16 is such that check valve 32 in branch conduit 30 would be closed as indicated in FIG. 1.

Referring now to FIG. 5, the mixture of water and oil or hydrocarbon contaminants passes upwardly of pipe 36 into the separator 38 at essentially the suction velocity of pump 16 degraded by the condition and efficiency of filter 12. The structure of separator 38 is such that a relatively large volume is provided for fluid flow which results in a decrease in velocity of the stream within the second cavity 52, thus permitting the lighter oil or hydrocarbon contaminants to reach the topmost portions of the fluid stream. That is, the portions adjacent the third hollow cone member 44 flow upwardly along the inner surface of the third hollow cone member 44 while the water flows upwardly along the outer surface of the first hollow cone member 40 to flow downwardly through hole 43. The oil rises through hole 53 to accumulate in the top of separator chamber 34 (see FIG. 1). The water passes downwardly through the first cavity 42 and outwardly of the two hollow cylinders 47, 48 into the lower portion of separator cavity 34 to be withdrawn through conduit 55 by pump 16. Again, it is emphasized that pump 16 is purposely placed downstream of the separator cavity during the oil separation phase to reduce emulsification of the oil and water passing into the separator chamber.

Fluid is passed through pump 16 and pumped under pressure into conduit 57 and into the coalescer chamber 35 which forms the upper portion of the separator filter housing. The fluid is passed into the interior of the coalescer elements 58 in a manner well known in the art allowing most of the remaining lighter hydrocarbons to coalesce and rise to the top of the coalescer chamber 35 wherein they are skimmed off through the filter manifold 59 into conduit 62. In the meantime, the now relatively oil free water is forced outwardly through one or a plurality of outlet conduits 60 into the final or polishing filter stage 20. As previously noted, these final polishing filter elements are of the charcoal variety, again, well known in the art. Contaminants or hydrocarbons separated in this final polishing phase are allowed to accumulate at the top of the filter elements and are discharged through outlet manifold 61 into the oil collecting manifold 63 for communication back into the separator chamber 34 by conduit 65. It is important to note that conduit 65 is a single conduit of smaller diameter than the combined diameters of the outlet conduit 60 communicating fluid from the coalescer chamber 35 to the final or polishing filters 20. This smaller diameter of conduit 65 is important in that the pump 16 is forcing the fluid into the coalescer chamber 35 under pressure so that there is a continuous stream outwardly through filter manifold 59 and also in a continuous stream outwardly of outlet manifold 61 in the final or polishing filter arrangement. This results in the necessary pressure upstream of the coalescer filters and the polishing filters for their efficient operation. There is a continuous stream passing through conduit 65 into the separator chamber 34 which is operating at a lower pressure than the coalescer chamber and the final or polishing filters resulting in check valve 66 being open in this stage of the operation. Even though the major part of fluid passing through conduit 65 may be water, any oil contained therein will tend to rise to the top of the separator chamber as it passes into the separator chamber. Simultaneously, substantially oil-free water is vented through conduit 70 for overboard discharge.

As the oil level in the separator chamber 34 moves downwardly, the probe 83 senses the change from water to oil, for example, by the differing resistance of the two fluids to electrical current. This signal is communicated to the power and sensing circuit where it is stored in the logic therein. As the oil passes the lower probe 84 a similar signal is sent to the power and sensing circuit to indicate the oil has reached a predetermined level so that the pump circuit should be reversed to discharge oil through conduit 87. The power and sensing circuit is designed to stop the pump 16 and to reverse direction of the pump 16 after an appropriate wait.

Figure 2:
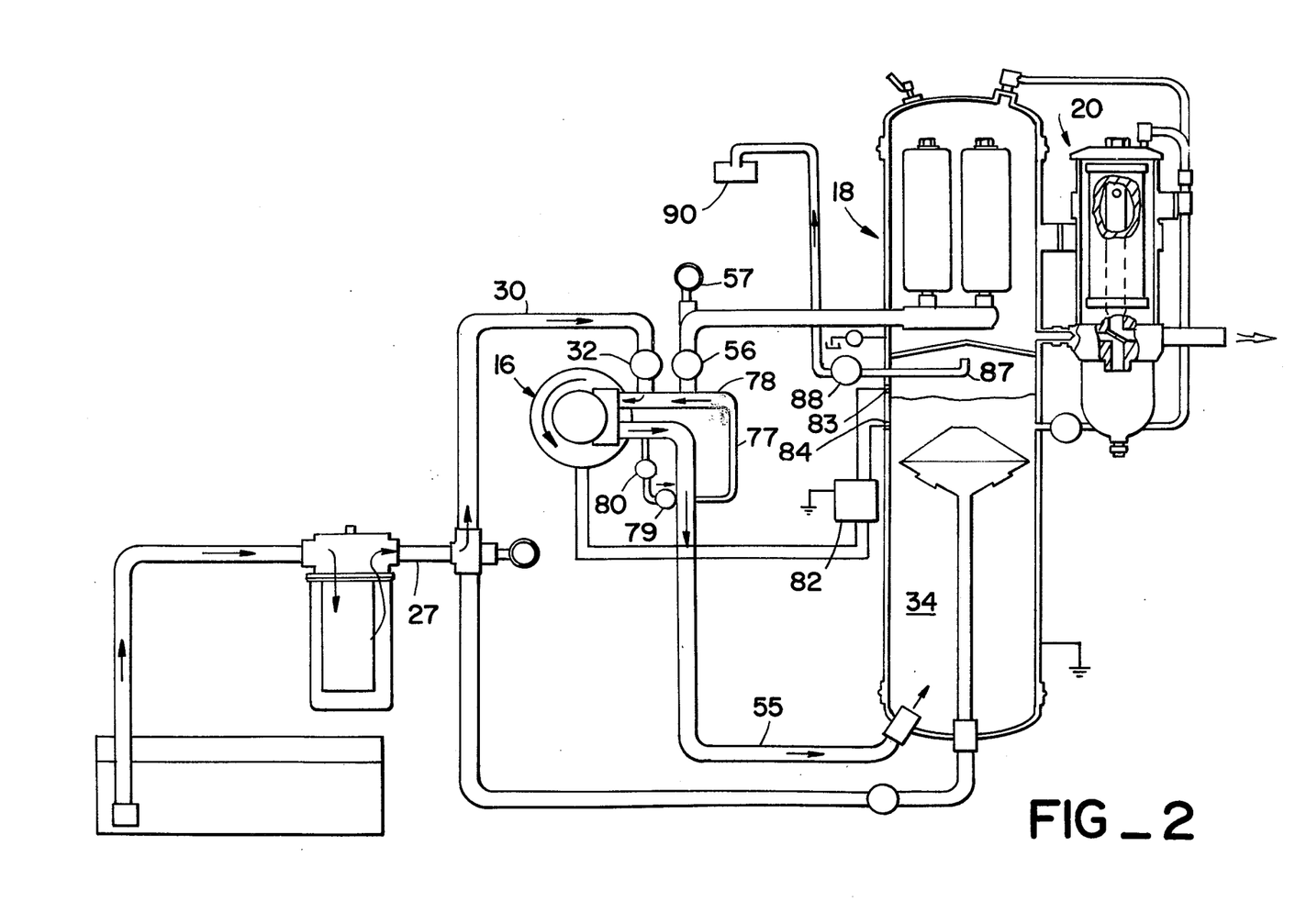
FIG. 2 is the same embodiment as shown in FIG. 1 but showing the fluid flow reversed to discharge separated oil to the holding tank.

Referring to FIG. 2, the check valves are shown in a position they will assume upon rotation of the pump 16 in the opposite direction just described. In particular, fluid will now be drawn through conduit 30 of the branch conduit 27 past check valve 32 and into pump 16 for discharge into conduit 55.

It has been found expedient to decrease the flow in conduit 55 during the oil discharge phase in certain embodiments where the pump capacity and the filtering capacity exceed that of the discharge capacity from chamber 34, which should be kept at a minimum in order to prevent surging or roiling of the oil and water therein. In order to accomplish this decrease in fluid flow in line 55, bypass 77 with check valve 79 (previously described) is incorporated into the primary embodiment. With pump 16 rotating in the direction shown in FIG. 2, check valve 79 opens and allows a certain amount of fluid to bypass back into conduit 78 and thus into the intake side of pump 16. The remaining fluid passes through conduit 55 into separator chamber 34 thus floating off accumulated oil in the top of separator chamber 34 through conduit 87 and check valve 88 to the sump 90. As the oil level passes probe 84, a signal is communicated to the power and sensor circuit 82. As the oil level continues to rise and passes probe 83, a similar signal is communicated to the power and sensing circuit which, in its memory, has stored the direction of rotation of pump 16 and the sequence of signals from probes 83 and 84. Once the signal is received from probe 83 that the oil level has now risen above probe 83, the pump 16 is again stopped for an appropriate period of time and reversed in direction and the normal bilge pumping cycle is started again. It should be noted during the oil discharge cycle that check valve 56 in conduit 57 is closed by the suction of pump 16. This prevents the contaminated fluid in conduit 30 from prematurely contaminating the coalescing elements and polishing elements in the coalescing stage 18 and the polishing stage 20.

Upon installation and initial start up, a special procedure is necessary to eliminate air from the filter stages, in addition to priming of the entire system. Accordingly, the valve 80 has been placed in the bypass 77 for this purpose. Referring again to FIG. 1, the conduit 22 leading to the first stage filter is primed for initial start up. The valve 80 is closed to prevent the bypass of fluid from occurring which has just been described. At start up, with no fluid in the system, the pump will rotate in the oil dump mode as indicated in FIG. 2 so that the chamber 34 is rapidly filled. Venting of any trapped air will be through conduit 87 outwardly of the oil sump. It should be readily apparent to those skilled in the art that as the water level passes the lower probe 84 and the upper probe 83 the direction of the pump is changed to the normal cycle as indicated in FIG. 1. Bypass valve 80 should be opened during the time the pump is reversing. With the pump now running in the first or normal direction, fluid will now be withdrawn from the separator chamber 34 and thus sump 23 through pipe 36 and separator 38 to attempt to maintain the level substantially as indicated in FIg. 1, that is, in the area of probe 83. Fluid is pumped through conduit 57 into the coalescing filter section 18 and the final polishing filter stage 20 as earlier described. However, entrapped air in the coalescing filter section and the final or polishing filter arrangement is forced through conduit 65 into the separator section 34 thus lowering the liquid level in the separator chamber 34 below the first probe 84 which results in a reversal of pump 16. This cycle will continue until the air is entirely removed from the system. Once the entrapped air has been eliminated, the system is ready for service.

DESCRIPTION OF THE ALTERNATE EMBODIMENT

Figure 3:
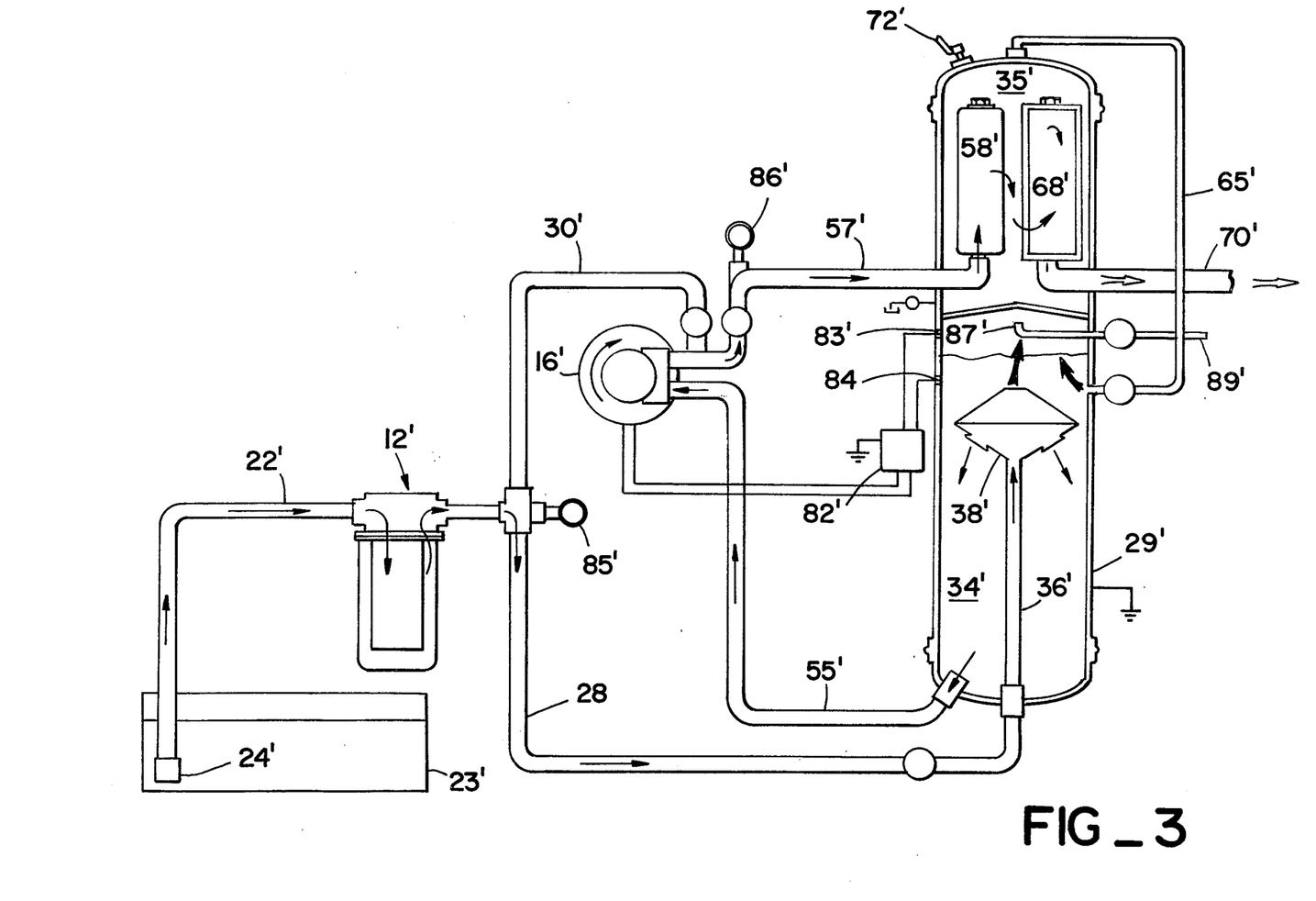
FIG. 3 is an alternate and smaller embodiment of the invention shown in FIG. 1, and showing the fluid flow during the separation phase.
Figure 4:
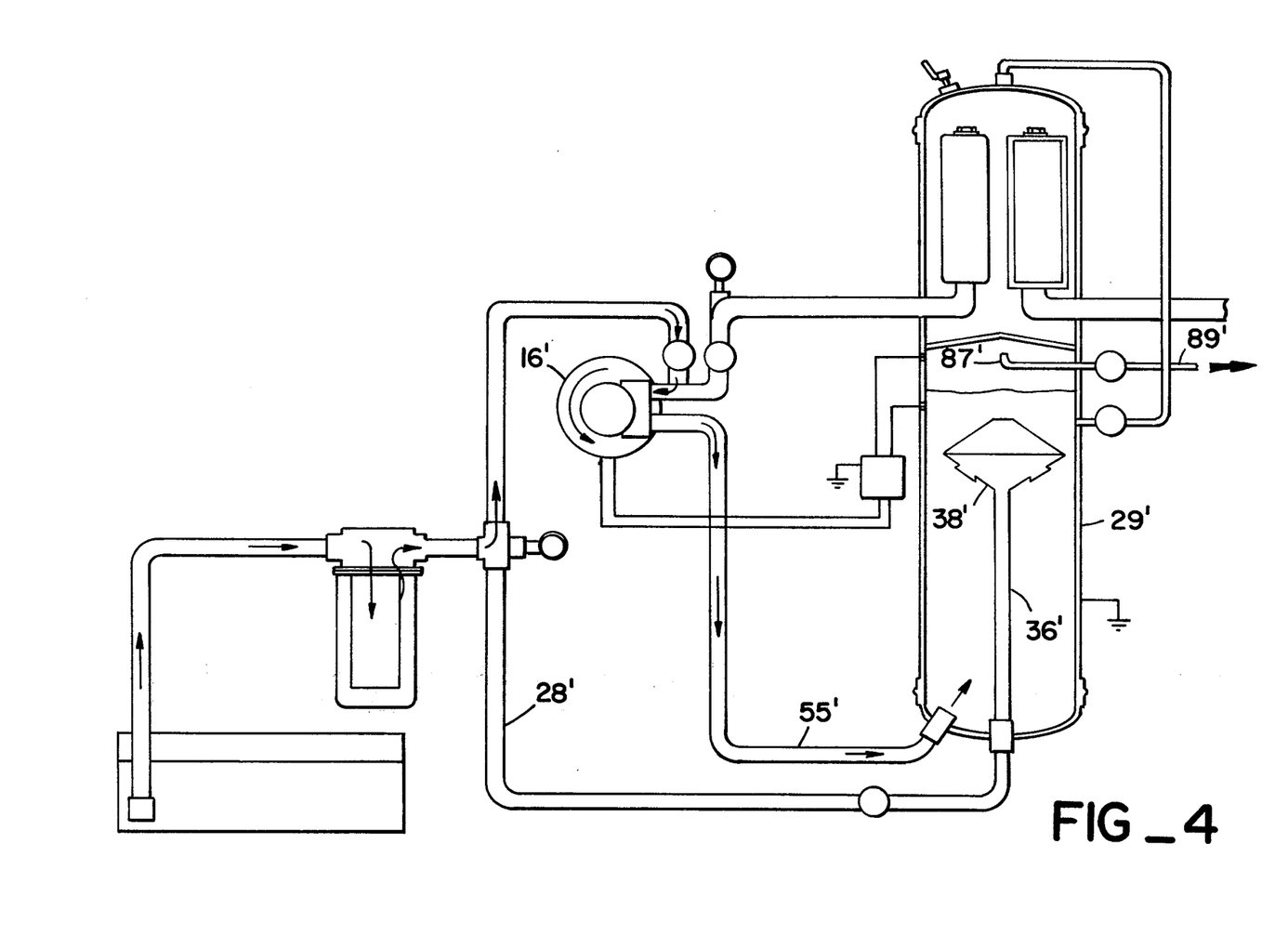
FIG. 4 is the same embodiment illustrated in FIG. 3 but showing the fluid flow reversed to discharge separated oil.

Referring now to FIGS. 3 and 4 for an alternate embodiment and the operation thereof, it can be seen that the primary difference is the elimination of the bypass circuit and the incorporation of the final or polishing filter into the upper chamber of the separator and filter housing. Like elements in the alternate embodiment will be numbered in the same sequence as the elements in the primary embodiment with the addition of a prime.

It should be noted that the alternate embodiment is specifically designed for a lower capacity system relative the first system, nevertheless, the principles of operation are identical to the first system except, as noted, the bypass 77 has been eliminated because the pump capacity is matched to a filter capacity of one coalescing filter element and one polishing filter element.

In the alternate embodiment, conduit 22' is for interconnection with the filter element 12' to communicate the oil and water from the bilge 23' to the first phase filter 12'. Fluid is passed from the first phase filter 12' through the branch 28' of the branched conduit into the separator and filter housing 29' as described in the primary embodiment and thence withdrawn from the separator chamber 34, wherein the majority of the oil and water has been separated, to pass through the pump 16' into conduit 57' under pressure and into the coalescing filter 58'. It should be noted that the coalescing filter 58' and the final or polishing filter 68' are located in the same chamber thus only a single manifold or conduit 65' is used to communicate the top chamber 35' to the separator chamber 34.

OPERATION OF THE ALTERNATE EMBODIMENT

Operation of the alternate embodiment shown in FIG. 3 is identical to that of the primary embodiment with the exception of the bypass from the inlet to the outlet side of the pump 16'. As previously noted, the bypass is not necessary because the pump capacity has been decreased while maintaining essentially the same size elements in the various sections of the system thus the roiling of the fluid in the separator chamber 34' is at the same level as that in the primary embodiment upon reversal of the system. FIG. 4 illustrates the positioning of the check valves in the alternate embodiment in the oil discharge cycle.

Although not necessary to either embodiment, it is appropriate in some cases to add a sight gauge to the separator chamber 34. This sight gauge is not illustrated.

Although this invention has been described in relation to two embodiments, it is not to be considered limited by the specification to these two embodiments, but rather is limited only by the appended claims.

What is claimed is:

1. A method for separating fluids having differing densities, the relatively heavier fluid immiscible in the lighter fluids, comprising the steps of:
   (a) providing a first elongated enclosed volume having its axis of elongation vertically oriented;
   (b) coupling a source of immiscible fluids with said first elongated enclosed volume intermediate the upper and lower ends thereof;
   (c) coupling a pump with the lower portion of said first elongated enclosed volume to draw a flow of fluids through said first elongated enclosed volume so that additional relatively unemulsified immiscible fluids are communicated by suction into the first elongated enclosed volume from said source;
   (d) deflecting the flow of said immiscible fluids communicated to said first elongated volume in the interior of said first elongated enclosed volume whereby the relatively heavier fluid communicated to said first volume from said source separates from the relatively lighter fluids concurrently communicated thereto to form a layered mixture of heavier and lighter fluids;
   (e) providing a second elongated enclosed volume having its axis of elongation vertically oriented;
   (f) communicating the fluid drawn through the first volume into said second elongated enclosed volume under pressure created by the pump;
   (g) deflecting the flow of fluid in said second enclosed volume so that coalescing of the light fluids is enhanced to thereby allow additional separation of said immiscible fluids;
   (h) venting heavier fluid relatively free of lighter fluids from the lower portion of said second elongated enclosed volume;
   (i) simultaneously with the venting step withdrawing fluid from the upper portion of said second elongated enclosed volume;
   (j) communicating the fluid withdrawn from said upper portion of said second elongated enclosed volume to said first elongated enclosed volume intermediate the upper and lower ends thereof; and
   (k) withdrawing separated lighter fluids periodically from the upper portion of the first elongated enclosed volume.

2. The method for separating immiscible fluids having differing densities as set forth in claim 1 wherein the relatively heavier fluid is water and the relatively lighter fluids are oil and comprising the additional step of filtering particulate matter from the oil and water being communicated to the first elongated enclosed volume.

3. The method for separating oil and water as set forth in claim 2 comprising the additional steps of:
   providing a third enclosed volume;
   dividing said third enclosed volume into two parts by means of a filter element capable of passing water from the first part to the second part while blocking the flow of oil from the first part to the secnd part;
   communicating the vented relatively oil-free water from the second elongated enclosed volume to said first part of said third enclosed volume;
   venting substantially oil-free water from said second part of said third elongated enclosed volume; and
   simulaneously with the preceding step of venting substantially oil-free water withdrawing fluid from the upper portion of said first part of said third elongated volume;
   and further wherein the step of communicating the fluid withdrawn from the upper portion of said second elongated enclosed volume to said first elongated enclosed volume includes communicating fluid withdrawn from the upper portion of said first part of said third elongated enclosed volume to said first elongated enclosed volume intermediate the upper and lower ends thereof.

4. The method for separating oil and water as set forth in claim 3 wherein the step for deflecting the flow of fluid in said second enclosed volume comprises the step of coalescing entrained oil in the flow of fluid.

5. The method of separating oil and water as set forth in claim 2 comprising the additional steps following the step of deflecting the flow of fluid in the second volume and before venting the relatively oil-free water of:
   dividing the second enclosed volume into two parts by means of a filter element capable of passing water from the first part to the second part while blocking the flow of oil from the first part to the second part wherein the deflection step for coalescing takes place prior to blocking the flow of oil from the first part to the second part and wherein the venting step takes place while blocking the flow of oil from the first part to the second part.

6. An apparatus for the separation of immiscible fluids having differing densities, the relatively heavier fluid immiscible in the lighter fluids, comprising:
   first elongated enclosed volume means having its axis of elongation vertically oriented for containing a volume of immiscible fluids;
   first conduit means for coupling a source of immiscible fluids with said first elongated enclosed volume means intermediate the upper and lower ends thereof;
   baffled separator means disposed in the interior of said first elongated enclosed volume means for deflecting the flow of immiscible fluids communicated to said first elongated enclosed volume means through said first conduit means whereby the relatively heavier fluid communicated to said volume means from said source separates from the relatively lighter fluids concurrently communicated thereto to form a layered mixture of heavier and lighter fluids;
   second elongated enclosed volume means having its axis of elongation vertically oriented for containing a fluid;
   pump means for withdrawing fluid from the lower portion of said first elongated enclosed volume means so that additional relatively unemulsified immiscible fluids are communicated by suction into said first elongated enclosed volume means through said first conduit means;
   second conduit means for communicating the withdrawn fluid under pressure created by said pump means to said second elongated enclosed volume means;
   coalescing means disposed in said second elongated enclosed volume for coalescing the flow of fluid in said second elongated enclosed volume to allow additional separation of said immiscible fluids;
   third conduit means for venting heavier fluid relatively free of lighter fluids from the lower portion of said second elongated enclosed volume means;

fourth conduit means for simultaneously withdrawing fluid from the upper portion of said second elongated enclosed volume means;

manifold means for communicating the fluid withdrawn from the upper portion of said second elongated enclosed volume means to the first elongated enclosed volume means intermediate the upper and lower ends thereof;

withdrawal means for withdrawing the separated lighter fluids periodically from the upper portion of the first elongated enclosed volume means.

7. The apparatus as set forth in claim 6 wherein the relatively heavier fluid is water and the relatively lighter fluids are oil further comprising:

first filter means interposed in the first conduit means for filtering particulate matter from the oil and water being communicated to the first elongated enclosed volume means.

8. The apparatus as set forth in claim 7 wherein the baffled separator means comprises:

first and second hollow cone members generally of equal size and rigidly affixed one to the other at their bases to form a first cavity, the first cone member truncated to form a hole communicating with said first cavity;

third and fourth hollow cone members generally of equal size and larger than said first and second hollow cone members;

first and second hollow cylinders affixed to said second cone member piercing the surface of revolution thereof and extending outwardly therefrom;

said fourth cone member affixed to said first and second hollow cylinders and said third cone member affixed in a base to base relation with said fourth cone member to form a second cavity containing said first and second hollow cone members, said first and second hollow cylinders piercing the surface revolution of said fourth cone member and communicating said first cavity through said second cavity to the first elongated enclosed volume means, and said third and fourth cone members each truncated to form respective holes communicating with the second cavity;

and further wherein said first conduit means communicates oil and water to said second cavity through the hole formed by the truncation of the fourth cone member;

whereby oil and water communicated to the second cavity through the hole formed by the truncation of the fourth hollow cone member is slowed to allow oil to float upwardly from the second cavity into the upper portion of the first elongated enclosed volume means through the hole in the third cone member and the water to sink through the hole in the first cone member into the first cavity and then pass downwardly and outwardly through said first cavity via said hollow cylinders to the lower portion of said first elongated enclosed volume means.

9. The apparatus as set forth in claim 8 further comprising:

third elongated enclosed volume means;

filter means disposed in said third elongated enclosed volume means dividing said third elongated enclosed volume into two parts for filtering a flow of oil in said third elongated enclosed volume means to allow additional separation of oil and water;

outlet means for venting substantially oil-free water from the second part of said third elongated enclosed volume means; and sixth conduit means for withdrawing fluid from the upper portion of said first part of said third elongated enclosed volume means and communicating said withdrawn fluid to the manifold means.

10. The apparatus as set forth in claim 9 wherein the pump means comprises a two directional rotary pump operable in a first direction to withdraw fluid from the first elongated enclosed volume means and operable in a second direction to communicate oil and water to the first elongated enclosed volume means.

11. The apparatus as set forth in claim 10 wherein the rotary pump means defines a first port communicating with the first elongated enclosed volume means and a second port communicating with the second elongated enclosed volume means.

12. The apparatus as set forth in claim 11 wherein the first conduit means comprises:

a branched conduit assembly including a first branch conduit communicating oil and water from the first filter means to the second cavity of the baffled separator means, a second branch conduit communicating oil and water from the first filter means to the second port of the rotary pump, and check valve means preventing communication of fluid from said second port to said first filter means.

13. The apparatus set forth in claim 12 further comprising restricted bypass means selectively operable with the rotary pump rotating in the second direction to divert a portion of the oil and water from the first port to the second port.

14. The oily water separator set forth in claim 13 further comprising sense means for sensing the amount of accumulated oil in the first elongated enclosed volume means and for determining the rotational direction of the two directional rotary pump based on the amount of oil accumulated in said first elongated enclosed volume means.

15. The apparatus of claim 8 further comprising second filter means disposed in said second elongated enclosed volume means interposed between the coalescing means and the third conduit means for filtration of fluid communicated thereto from the coalescing means to remove substantially all the remaining oil from the fluid.

16. The apparatus as set forth in claim 15 wherein the pump means comprises a two directional rotary pump operable in a first direction to withdraw fluid from the first elongated enclosed volume means and operable in a second direction to communicate oil and water to said first elongated enclosed volume means.

17. The apparatus as set forth in claim 16 wherein the rotary pump defines a first port communicating with the first elongated enclosed volume means and a second port communicating with the second elongated enclosed volume means.

18. The apparatus as set forth in claim 17 wherein the first conduit means comprises:

a branched conduit assembly including a first branch conduit communicating oil and water from the first filter means to the second cavity of the baffled separator means, a second branch conduit communicating oil and water from the first filter means to the second port of the rotary pump, and check valve means preventing communication of fluid from said second port to said first filter means.

19. The oily water separator set forth in claim 18 further comprising sense means for sensing the amount of accumulated oil in the first elongated enclosed volume means and for determining the rotational direction of the two directional rotary pump based on the amount of oil accumulated in said first elongated enclosed volume means.

20. In an apparatus for separating oil and water including a housing forming a volume for the accumulation of separated oil and conduit means for communicating oil and water to the housing, a baffled separator mounted for communication with said conduit means in said volume comprising:

first and second hollow cone members generally of equal size and rigidly affixed one to the other at their bases to form a first cavity, the first cone member truncated to form a hole communicating with said first cavity;

third and fourth hollow cone members generally of equal size and larger than said first and second hollow cone members;

a hollow cylinder affixed to said second cone member piercing the surface of revolution thereof and extending outwardly therefrom;

said fourth cone member affixed to said hollow cylinder and said third cone member affixed in a base to base relation with said fourth cone member to form a second cavity containing said first and second hollow cone members, said hollow cylinder piercing the surface of revolution of said fourth cone member and communicating said first cavity through said second cavity, said third and fourth cone members truncated to form respective holes communicating with the second cavity; whereby oil and water communicated to said second cavity through the hole formed by the truncation of the fourth hollow cone member is slowed to allow oil to float upwardly from said second cavity into the upper portion of said volume through the hole in said third cone member and the water to sink through the hole in said first cone member into said first cavity and thence pass downwardly and outwardly of said first cavity through said hollow cylinder to the lower portion of said volume.

21. A baffled separator for use in a chamber for gravity separation of immiscible fluids having differing densities comprising:

first and second hollow cone members generally of equal size and rigidly affixed one to the other at their bases to form a first cavity, the first cone member truncated to form a hole communicating with said first cavity;

third and fourth hollow cone members generally of equal size and larger than said first and second hollow cone members;

a hollow cylinder affixed to said second cone member piercing the surface of revolution thereof and extending outwardly therefrom;

said fourth cone member affixed to said hollow cylinder and said third cone member affixed in a base to base relation with said fourth cone member to form a second cavity containing said first and second hollow cone members, said hollow cylinder piercing the surface of revolution of said fourth cone member and communicating said first cavity through said second cavity, said third and fourth cone members each truncated to form holes communicating with the second cavity;

and conduit means for communicating immiscible fluids of differing densities to said second cavity through the hole formed by the truncation of the fourth cone member whereby the fluids communicated thereto are slowed to allow the relatively lighter fluids to float upwardly from said second cavity into the upper portions of said chamber through the hole in said third cone member and to allow the relatively heavier fluid to sink through the hole in the first cone member into said first cavity and thence pass downwardly and outwardly of said first cavity through said hollow cylinder into the lower portion of said chamber.

* * * * *